3,458,637
Patented July 29, 1969

3,458,637
COMPOSITIONS STABILIZED WITH TOCOPHER-AMINE ANTIOXIDANTS
Wolfgang Schlegel, Riehen, Ulrich Schwieter, Reinach, Basel, and Rudolf Tamm, Riehen, Switzerland, assignors to Hoffmann-La Roche Inc., Nutley, N.J., a corporation of New Jersey
No Drawing. Filed Dec. 14, 1964, Ser. No. 418,321
Claims priority, application Switzerland, Dec. 20, 1963, 15,752/63
Int. Cl. A61k 15/00; A23k 1/00; A23l 3/00
U.S. Cl. 424—283                                    5 Claims

ABSTRACT OF THE DISCLOSURE

Stabilized foods, feedstuffs, vitamin and cosmetic preparations containing antioxidant amounts of tocopheramines are disclosed.

---

The present invention relates to antioxidants and to compositions containing them.

Various chemical substances find extensive use in industry to protect oxidation-sensitive materials (especially drugs, foods, feedstuffs, food-colorants, etc.) from the detrimental effects of atmospheric oxygen. High standards are thereby set not only with respect to good stabilizing action but the agents which are used must be substantially nontoxic. The antioxidatively active agents of the invention fulfill these requirements.

The compositions of the invention contain an oxidation-sensitive material and an oxidation-retarding amount of a compound of the formula:

[Structure: chromane ring system with substituents $R_1$ at position 5, $R_2$ at position 7, $R_3$ at position 8, and $R_4R_5N$— at position 6; side chain with $CH_3$ and subscript $n$]

wherein $n$ is a natural number ranging from 0 to 3, inclusive; $R_1$, $R_2$, and $R_3$ are hydrogen or methyl; $R_4$ is hydrogen, alkyl, or acyl; and $R_5$ is hydrogen or alkyl.

In the above formula, $R_4$ and $R_5$ are preferably hydrogen or lower alkyl. By the term "lower alkyl" is meant a $C_1$ to $C_7$ straight or branched chain alkyl group, e.g., methyl, ethyl, isopropyl, tert. butyl, etc. The term "acyl" employed in connection with the above formula includes, for example, the lower alkanoyl groups from lower alkanoic acids, i.e., acyl groups of the formula $$R\overset{O}{\underset{\|}{C}}-$$

wherein R is hydrogen or a straight or branched chain $C_1$ to $C_6$ alkyl group, preferably formyl or acetyl. Also within the term "acyl" is benzoyl. In the above formula $n$ is preferably a whole number from 1 to 3 and most preferably 3.

The amines of Formula I are characterized by an excellent stabilizing action in many fields of use. For example, they can be employed in the food or feedstuff industry for the stabilization of cereals, animal and vegetable fats, oils, etc. Further examples of use are: vitamin preparations (especially those which contain vitamin A), carotenoid-containing foods or feedstuffs, cosmetic preparations (such as creams, soaps, etc.), and packing materials for such substances.

Beside the strong stabilization action, the compounds of Formula I are characterized by only very slight toxicity. Their use as antioxidants in oxidation-retarding quantities is therefore quite safe, in contradistinction to many antioxidants hitherto used. In contrast to most of the antioxidants hitherto known, they also possess noteworthy vitamin E activity owing to their structural relationship to vitamin E.

The use of the products as antioxidants is effected by adding a compound of Formula I to the material to be stabilized; for example, as the pure substance, in the form of a solution (e.g., in an oil) or as an emulsion. The antioxidatively active agents of Formula I can be present in dissolved or finely dispersed form in the substrate to be stabilized.

The antioxidatively active agents of Formula I can also be used in combination with other common antioxidants. Thus, the concentration of other less desirable antioxidants can be considerably reduced by the concurrent use of a compound of Formula I. For example, they can be used together with cysteine, ethanolamine, diethanolamine, lecithin, ascorbyl palmitate, isoascorbyl palmitate, citric acid, butylated hydroxy anisole, butylated hydroxy toluene, 1,2 - dihydro-6-ethoxy-2,2,4-trimethyl quinoline, etc.

The concentration in which the agents according to the invention are used depends, to a large extent, on the substrate to be protected. In general, the concentration varies between about 0.001 percent and about 10 percent, based on the weight of substrate. In the case of feedstuffs a concentration of about 0.005 to about 0.2 percent is preferred. Fats and oils conveniently contain the anti-oxidatively active agent in a concentration of about 0.001 to about 0.01 percent. Active material concentrates which are diluted just before use can, for example, contain up to 10 percent of the antioxidant. The previously mentioned concentration data are to be regarded only as guide-values which may be substantially reduced or increased. The percentages given are by weight.

Among the compositions of the invention, those which contain $\alpha$-tocopheramine, N-methyl-$\gamma$-tocopheramine, N-methyl-$\beta$-tocopheramine or N,N - dimethyl-$\delta$-tocopheramine are preferred.

The preparation of the compounds of Formula I can be effected by the reaction of a compound of the formula:

[Structure II: benzene ring with $R_4R_5N$— substituent, $R_1$, $R_2$, $R_3$ substituents, and —OH group]

(II)

wherein $R_1$, $R_2$, $R_3$, $R_4$, and $R_5$ have the same meaning as in Formula I, with compounds of the formula $$CH_2=CH-\overset{CH_3}{\underset{OH}{C}}-\left(CH_2-CH_2-CH_2-\overset{CH_3}{\underset{}{CH}}-\right)_n CH_3 \quad (III)$$

or $$HO-CH_2-CH=\overset{CH_3}{\underset{}{C}}-\left(CH_2-CH_2-CH_2-\overset{CH_3}{\underset{}{CH}}-\right)_n CH_3 \quad (IV)$$

in which $n$ has the same meaning as above, or with esters of these compounds of Formulae III and IV, e.g., lower alkanoyl esters.

By analogy with the nomenclature used in the case of the tocopherols, the various tocopheramines are also differentiated from one another by the following Greek letters.

EXAMPLE 1

75 g. of gelatin (Bloom-number 200–220), 25 g. of sugar and 0.6 g. of the disodium salt of the ethylenediamine tetraacetic acid are dissolved in 200 g. of deionized water in a nitrogen atmosphere at 50 to 60° C. A mixture of 48 g. of vitamin A palmitate (content: 1,800,000 Internatinal Units of vitamin A per gram) and 10.8 g. of α-tocopheramine is emulsified into the warm solution which is then stirred until the diameter of the oil droplets is less than 5 microns.

The emulsion obtained is dispersed at a temperature of 50 to 55° C. while stirring in 230 g. of paraffin oil of 20°. As soon as the majority of the droplets of the aqueous phase have attained a diameter between 100 to 600 microns, external cooling is rapidly applied until the temperature of the dispersion has fallen to about +10° C. The dispersion is subsequently diluted with petroleum ether. The gelled particles are filtered and the adhering paraffin oil is removed with petroleum ether. The gelatin beadlets are dried in a stream of air of 30 to 50° C. up to a residual content of 3 to 5 percent water and screened on a U.S.P analytical set of sieves. The fractions between 40 to 60 mesh and 60 to 80 mesh are mixed in a proportion of 1:1. This material, with a vitamin A content of about 350,000 I.U. per gram, is tested for stability.

Six samples of this product (each of about 130 mg.) are accurately weighed, each mixed with 500 mg. of a mineral salt mixture of the composition:

| | Percent |
|---|---|
| Calcium carbonate | 40 |
| Calcium phosphate | 30 |
| Cattle salt | 24.5 |
| Magnesium sulfate | 5 |
| Trace element sulfates (Fe, Cu, Mn, Co) | 0.5 | in open glass dishes (diameter 4 cm.) and kept in an air-conditioned cupboard at 45° C. and 85 percent relative humidity. After 2 and 4 weeks, respectively, the vitamin A is extracted from three samples each time and determined spectrophotometrically with the correction according to Morton/Stubbs. There is found in the composition after 2 weeks a vitamin A content of 84 percent (after 4 weeks, 77 percent) of the initial content.

A product manufactured in an analogous manner with 10.8 g. of α-tocopherol after 2 weeks' storage no longer shows a measurable content of vitamin A.

Three samples of product containing α-tocopheramine are accurately weighed and without further addition are kept open in a circulating air drying cupboard at 45° C. After 8 weeks, the vitamin A content is 86 percent of the initial content.

EXAMPLE 2

A mixture is manufactured from 550 mg. of vitamin A palmitate (containing 1,800,000 International Units vitamin A per gram), 10 mg. of α-tocopheramine and 100 mg. of diethanolamine. Each ⅓ of this mixture (about 220 mg.) is accurately weighed into a glass beaker, on the bottom of which is situated a glass platelet (3 cm. x 3 cm.). By movement to and fro, it is ensured that the preparation is uniformly distributed on the glass platelet. The glass beakers are now placed open in an oven of 37° C. After 200 hours the glass beakers are removed, each specimen is separately dissolved in cyclohexane and the vitamin A content is determined. On the average, this amounts to 90 per cent of the initial content.

EXAMPLE 3

63 g. of gelatin (Bloom-number 200–220), 21 g. of sugar and 0.6 g. of the disodium salt of ethylenediamine tetraacetic acid are dissolved in 180 g. of deionized water, at 50 to 60° C., and in a nitrogen atmosphere as described in Example 1. A mixture of 48 g. of vitamin A palmitate (content: 1,800,000 International Units per gram), 17.8 g. of arachis oil, 5.4 g. of butylated hydroxy anisole, 108 g. of ethanolamine and 5.4 g. of α-tocopheramine is emulsified into this solution, which is stirred until the diameter of the oil droplets is less than 5 microns. The emulsion obtained is sprayed into starch with the help of a rotating perforated cylindrical nozzle. The resulting mixture of solidified gelatin globules and starch is dried in a stream of air of 30 to 50° C. and the starch separated by sieving. The vitamin A-containing gelatin globules are screened off as in Example 1 and a mixture in the proportion of 1:1 of the 40 to 60 mesh and 60 to 80 mesh sieve fractions is prepared. This mixture is subjected to stability testing.

Six samples of the above mixture (each of ca. 130 mg.) are accurately weighed and kept in open glass dishes of 4 cm. diameter in an air-conditioned cupboard at 45° C. and 85 percent relative humidity. After 2 and 4 weeks, respectively, the vitamin A is extracted, each time from three samples, and determined spectrophotometrically with regard to the correction according to Morton/Stubbs. There is found after 2 weeks a vitamin A content of 94 percent (after 4 weeks, 84 percent) of the initial content.

A product manufactured in an analogous manner with 5.4 g. of α-tocopherol in place of 5.4 g. of α-tocopheramine shows no measurable content of vitamin A after 2 weeks' storage.

EXAMPLE 4

Sunflower oil which is stabilized with 50 mg./kg. of α-tocopheramine and 100 mg./kg. ascorbyl palmitate shows a peroxide number of 13 after storage at 25° C. for 60 days, as against an untreated specimen in which a peroxide number of 28 is determined after the same time.

EXAMPLE 5

Pork lard, to which 50 mg./kg. of N-methyl-γ-tocopheramine is added, shows a peroxide number of 12 after a 90-day storage at 25° C., as against an untreated specimen which shows a peroxide number of 41 after equally long storage.

EXAMPLE 6

An 0.5 percent solution of β-carotene in arachis oil is treated with 100 mg./kg. of γ-tocopheramine. While a similar untreated preparation shows a β-carotene content of 62 percent after 50 days' storage at room temperature, the solution stabilized with γ-tocopheramine still contains 89 percent of the initial content of β-carotene.

EXAMPLE 7

Two batches of grass-meal (10 kg. each), to which no antioxidants are added, are sprayed with thorough mixing with 300 ml. of an ethyl-alcoholic solution of α-tocopherol and α-tocopheramine, respectively. The alcoholic solution contains 1250 mg. of α-tocopherol or α-tocopheramine, so that the end concentration in the grass-meal amounts to 125 p.p.m. A further sample of grass-meal is treated only with alcohol and immediately analyzed. The two 10 kg. batches containing α-tocopherol or α-tocopheramine, respectively, are dried for two days in the air and then kept at room temperature in paper sacks. After a month the two batches are analyzed for their carotenoid content.

The values follow in the following table:

| | β-carotene (mg./kg.) | Total xanthophylls (mg./kg.) |
|---|---|---|
| Initial content | 184 | 390 |
| Content after one month: | | |
| Treated with α-tocopherol | 139 | 348 |
| Treated with α-tocopheramine | 157 | 402 |

The β-carotene content has therefore decreased by about 24 percent in the samples treated with α-tocopherol, while the decrease with the samples treated with α-tocopheramine amounts to only 15 percent. In the case of the xanthophylls the decrease for the fodder treated with α-tocopherol amounts to 11 percent, while the fodder treated with tocopheramine even shows an increase. The reason for such increase is that with the decomposition of β-carotene there result carotenes which have xanthophyl properties. The decomposition of the β-carotenes was obviously stopped at this stage by the addition of α-tocopheramine.

EXAMPLE 8

(a) 15 g. of a 0.05 percent solution of β-carotene in peanut oil is stored in an open Petri dish at 45° C. After 18 days the peroxide number of the oil solution changes from an original 1.5 to 10, and after 30 days' standing the β-carotene content is 80 percent of the initial content.

(b) The solution described in (a) is mixed with 0.05 percent of α-tocopheramine. The peroxide number changes to 10 after 37 days, and the β-carotene content of 80 percent of the initial content occurs after 42 days.

(c) A further improvement of stability is obtained by the addition of 0.5 percent ethanolamine to the solution described in (b) above, the 80 percent β-carotene retention period is 77 days, and the obtention of a peroxide number of 10 occurs after 88 days.

EXAMPLE 9

(a) 15 g. of a 0.05 percent solution of β-apo-8'-carotenal in peanut oil is stored in an open Petri dish at 45° C. The peroxide number changed from an original 1.5 to 10 to 20 days, while the content of β-apo-8'-carotenal is 80 percent after 40 days.

(b) By the addition of 0.05 percent α-tocopheramine to the solution in part (a), the peroxide number of 10 is obtained only after 43 days and the content of β-apo-8'-carotenal is at the 80 percent figure after 55 days at 45° C.

(c) A synergistic activity is obtained by the addition of 0.5 percent ethanolamine to the solution of part (b) above. The 80 percent retention of β-apo-8'-carotenal occurs after 70 days and the peroxide number of 10 occurs after 75 days at 45° C.

EXAMPLE 10

(a) Six parts by weight of vitamin A palmitate are mixed with 14 parts by weight of a nonionic emulsifying agent (oleum Ricini polyoxyathylatum) and stirred with 80 parts of distilled water to form a lightly opalescent aqueous solution. The solution is stirred in a closed flask at 45° C. whereupon the vitamin A content after a month is 88.5 percent, after two months is 80.8 percent, and after three months is 78.6 percent.

(b) A solution identical to that in part (a) above is prepared except that 0.1 parts by weight of γ-tocopheramine are added. After stirring as above, the vitamin A content after one month is 93.4 percent, after two months is 85.6 percent, and after three months is 83.8 percent.

EXAMPLE 11

(a) 250 parts of vitamin A palmitate are stored at 45° C. in a thin layer in the open. After about 8 hours, the vitamin A content is only 80 percent.

(b) 250 parts of vitamin A palmitate and 10 parts by weight of N-methyl-β-tocopheramine is stored as above at 45° C. 80 percent of the original vitamin A content is present after 20 hours.

(c) 250 parts of vitamin A palmitate are mixed with 10 parts by weight of N-methyl-β-tocopheramine and 70 parts by weight of diethanolamine dipalmitate. A very marked stabilization of the vitamin A occurs wherein the 80 percent retention figure is obtained after 42 hours at 45° C.

EXAMPLE 12

(a) 50 g. of safflower oil is placed at room temperature in a 150 ml. glass flask. The peroxide number of the oil is originally at 7 and after 13 days' storage is 47.

(b) 2.5 mg. of β-tocopheramine and 10 mg. of ascorbyl diacetate are dissolved in 50 g. of safflower oil and allowed to stand as in part (a) above. After 13 days, the peroxide number changed to only 17.

We claim:

1. A composition of matter comprising an oxidation-sensitive material selected from the group consisting of foods, feedstuffs and vitamin preparations and an oxidation-retarding amount of a compound of the formula:

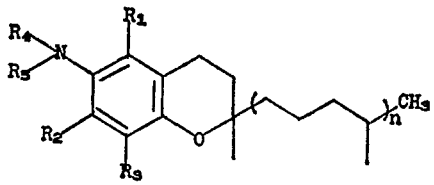

wherein $n$ is a number from 0 to 3, inclusive; $R_1$, $R_2$ and $R_3$ are each selected from the group consisting of hydrogen and methyl; $R_4$ is lower alkyl, and $R_5$ is selected from the group consisting of hydrogen and lower alkyl.

2. A composition according to claim 1 wherein the oxidation-retarding compound is N-methyl-γ-tocopheramine.

3. A composition according to claim 1 wherein the oxidation-retarding compound is N-methyl-β-tocopheramine.

4. A composition according to claim 1 wherein the oxidation-retarding compound is N,N-dimethyl-δ-tocopheramine.

5. A composition according to claim 1 wherein the oxidation-retarding compound is present in a range of from about 0.001 percent to about 10 percent by weight of the oxidation-sensitive material.

References Cited

UNITED STATES PATENTS 3,105,793  10/1963  Lobel _____ 167—65 X
3,153,040  10/1964  Robeson et al. _____ 99—163 X
3,136,695  6/1964   Tanseg _____ 167—65 X ALBERT T. MEYERS, Primary Examiner
S. MANELLO, Assistant Examiner U.S. Cl. X.R.

99—163; 252—403; 424—284